Inventor
Lucien Gerardin.
By
Stone & Mack
Attorneys.

United States Patent Office 3,207,988
Patented Sept. 21, 1965

3,207,988
PULSE RADAR RECEIVER
Lucien Gerardin, Paris, France, assignor to Compagnie Francaise Thomson-Houston, Paris, France, a French body corporate
Filed June 7, 1961, Ser. No. 115,346
Claims priority, application France June 8, 1960, 829,354
3 Claims. (Cl. 325—323)

The present invention relates to a pulse radar receiver comprising a threshold device which produces a voltage of predetermined value when the video frequency voltage which is applied to it exceeds a certain level. This threshold device remains inoperative when the video frequency voltage remains lower than a certain level.

The characteristics of such a receiver depend upon the duration of the pulses emitted by the pulse radar system of which the receiver forms a part. In contradistinction to the short pulse pulse radar systems, those which transmit an electromagnetic wave modulated by long pulses do not allow precise measurements of distance to be effected. It is known that if the pass band of a pulse radar receiver is large, short pulses of an amplitude greater than the relatively considerable amplitude of the noise components are received in a satisfactory manner. If, on the other hand, this pass band is small the noise amplitude is reduced but only long pulses can be received in a satisfactory manner. Thus it will be understood that a short pulse means a good definition with a poor range because of the relatively small mean energy transmitted whereas a long pulse means a poor definition but a better range because of the relatively high means energy transmitted. It will be clear that the invention deals preferably with long pulse radar. Thus one is forced to adopt a compromise according to which the product of the width of the pass band B of a receiver and the duration T of the pulses emitted must be in the neighborhood of 2. If the symbol T is expressed in microseconds the symbol B is expressed in kilocycles.

It may be shown that under these conditions the reception of a substantially square pulse results in the appearance of a practically symmetrical triangular pulse at the output of the video frequency stage. If the received pulses have different amplitudes but a fixed duration, it is the same for the pulses produced by the video frequency stage. It can be so when the pulse radar system receives echoes coming from different objects.

Certain receivers comprise a threshold device which transforms the triangular video frequency pulses which have an amplitude greater than a certain threshold into square pulses of fixed amplitude while it blocks the others. The duration of these square pulses is a function of the amplitude of the video frequency pulses and therefore of the amplitude of the pulses reflected by the objects. In the receivers of the type in question, the distance between the pulse radar system and an object marked in the course of one reception period is measured by the position of the pulse corresponding to this object in the course of this period. However, the exact distance relative to an object is proportional to the duration of the internal of time between the initial instant of the reception period and the instant at which the amplitude of the video frequency pulse is at its maximum. In consequence the measurement of distance effected by this type of receiver is spoiled by a systematic error.

When the receiver is intended to search for several objects simultaneously, the measurement of the distance between the latter and the pulse radar system is quantized. This receiver has the same defects as the receiver of the type which has previously been described.

The already mentioned defects are strongly emphasised when the voltage produced by the threshold device, following the video frequency amplifier, includes noise components. Under these conditions the pulses of the video frequency voltage do not have a stable form from one reception period to the subsequent one. The slopes of the sides of these pulses are affected by fluctuation. The result is that the quantized measurement of the distance between the pulse radar system and an object can vary in an irregular way from one pulse to another, which disturbs the functioning of the device which indicates the presence of each object.

The receiver, which is the object of the invention, does not have the defects which have just been decsribed. In such a receiver use is made of the fact that the instant at which the amplitude of a video frequency pulse has its maximum value is very much less sensitive to the presence or to the absence of noise than the instants at which this pulse appears or disappears. A pulse which serves to determine the distance between the pulse radar system and the object is produced when the amplitude of the video frequency voltage passes through a maximum after having become greater than a predetermined value or threshold.

In a pulse radar receiver according to the invention the voltage produced by the video frequency stage and a voltage obtained by the differentiation of the former voltage are respectively applied to a threshold device and to a limiter circuit, the first of these producing a voltage of predetermined value when its input voltage has an amplitude greater than a certain threshold. Whilst the threshold of the first device is determined so that the production of a pulse indicates the presence of an object, the characteristics of a second device are fixed so that the voltage produced by this device undergoes rapid variations when the amplitude of the input signal takes on a maximum or minimum value.

The voltages of the two devices are respectively applied to the inputs of a multiplier device. The voltage produced by the latter is differentiated, which allows short pulses to be obtained. The instants at which said pulses appear correspond alternately to the instants at which the amplitude of the video frequency voltage has these maximum and minimum values. These short pulses are selected according to their polarity so as only to retain those which correspond to the maxima of the video frequency voltage. The selected pulses are used in a known manner to determine the distance between the pulse radar system and each of the objects to which said pulses correspond.

In order that the invention may be more fully understood, reference will now be made to the accompanying drawings in which.

Figure 3:
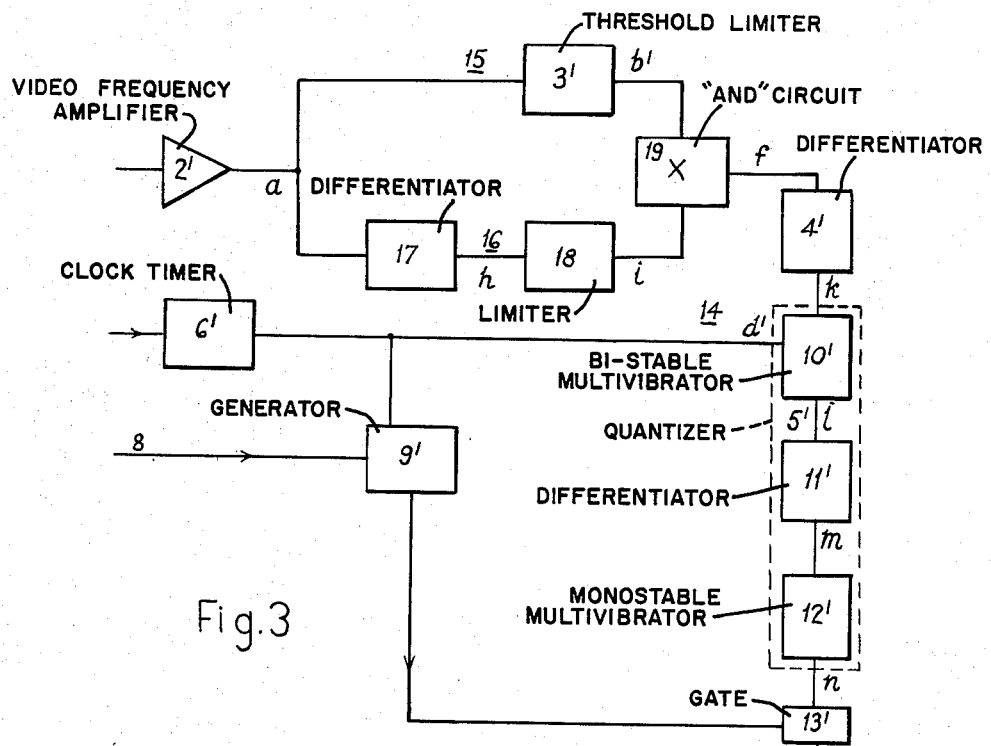
FIGURE 3 is the circuit diagram of a portion of a pulse radar receiver according to the invention.
Figure 4:
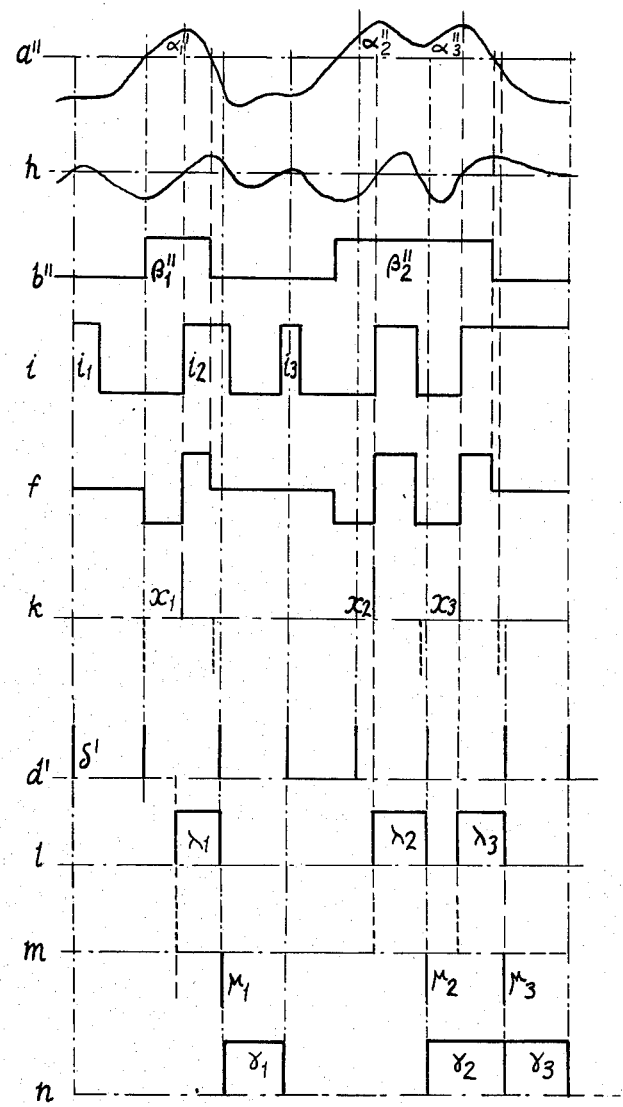

FIGURE 4 comprises diagrams which show the voltages appearing at the different points of the receiver in FIGURE 3.

Figure 1:
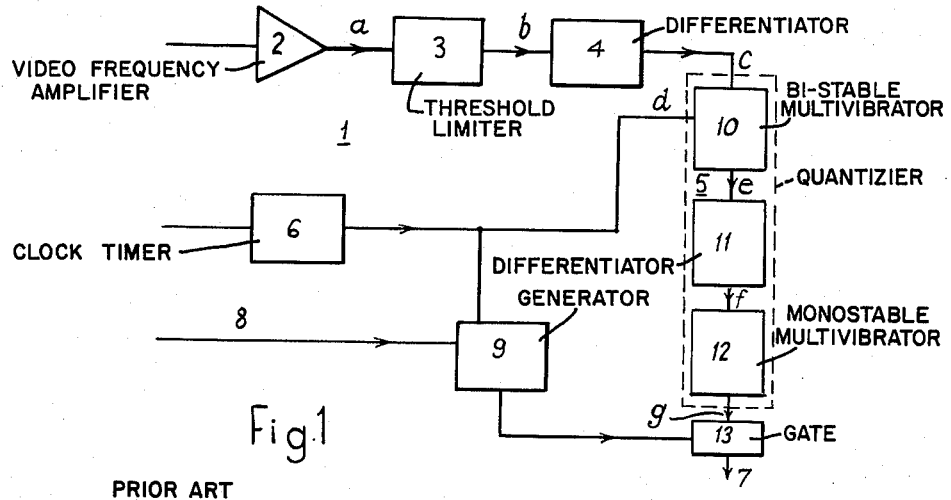
FIGURE 1 is a block diagram of part of a pulse radar receiver of a known type, which serves to determine the distance between each object and the pulse radar system of which the said receiver forms a part, FIGURES 2A and 2B comprise diagrams showing the voltages which appear at different points of the receiver in FIGURE 1.

Several portions of the receiver 1 in FIGURE 1 are not shown. These are the high frequency stages, the frequency converter stage and the detector stage. Finally only the last stage 2 of the video frequency amplifier has been shown, at the output of which appears the voltage represented at line $a$ in FIGURE 2A. The amplifier 2 is connected to the threshold limiting device 3, which sorts the pulses of the video frequency voltage (pulse $\alpha$ of line

*a* for instance) according to their amplitude and limits them. Square pulses (pulse $\beta$, line *b*) appear at the output of the device 3 which pulses are applied to the input of a differentiator 4. Each time that the latter receives a pulse $\beta$, it produces a short pulse $\gamma$ (line *c*) and the instant at which this appears is very near to the initial instant of the square pulse. The differentiator also produces a short pulse $\theta$ (line *c*) which is not transmitted and the instant at which this pulse appears is very near the final instant of the square pulse.

Each short pulse $\gamma$ is applied to a duration quantizer 5. The latter compares the instant at which this pulse appears with the instants at which appear a series of short recurrent pulses $\delta$, coming from a generator or timer 6. The quantizer produces a pulse which coincides with the first repetition cycle of the pulses $\delta$ after the appearance of the pulse $\gamma$. The recurrent pulses $\delta$ are shown in line *d* in FIGURE 2A. When the short pulse $\gamma$ is applied to the quantizer 5, the latter produces a pulse $\eta$ which is transmitted to the gate circuit 13 which is then released. The opening of this gate connects the calculating devices 7 for the trajectory of each marked object and the arithmetical signal generator 9 which serve to measure the duration of the interval of time which has passed since the initial instant of the period of functioning in the course of the equipment of which the receiver forms a part. It should be noted that this generator 9 on the one hand receives the short pulses $\delta$ produced by the timer 6 and on the other hand the pulses emitted by the pilot device 8 of the transmitter (not shown) at the beginning of each period of operation of the equipment.

The structure of the quantizer 5 will now be described. It comprises a bi-stable multivibrator 10, a differentiator 11 and a mono-stable multivibrator 12. The device 10 operates when it receives a short pulse produced by the differentiator 4 (pulse $\gamma$) and it operates a second time when it receives the pulse $\delta$ which follows the pulse $\gamma$. Thus there appears at the output of the multivibrator 10 a square pulse $\epsilon$ (line *e*) having a duration less than the period of repetition of the pulses $\delta$.

The pulse $\epsilon$ is applied to a differentiator circuit 11 which produces short pulses $\zeta_1$ and $\zeta_2$. The instant at which the latter appears is very near the final instant of the pulse applied to the differentiator circuit. This pulse $\zeta_2$ is applied in order to trigger the mono-stable multivibrator 12 at the output of which there then appears the square pulse $\eta$.

Figure 2A:
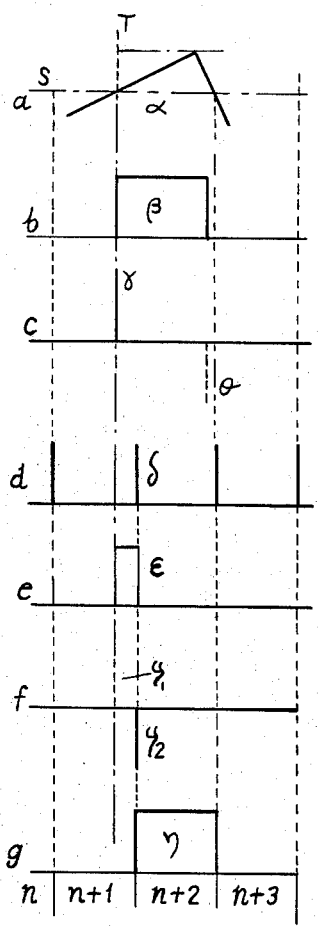
Figure 2B:
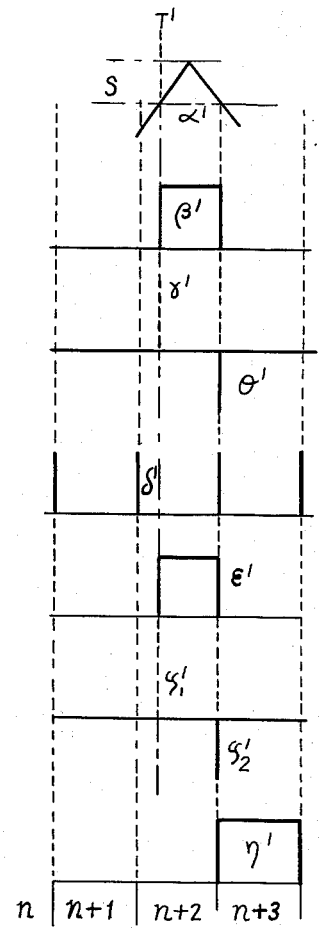

Whilst the diagrams in FIGURE 2A show the pulses which appear at different points of the circuit of FIGURE 1 when the video frequency voltage does not have any parasitic component, the diagrams in FIGURE 2B relate to the case in which the noise components are superimposed on the useful components of the video frequency voltage. It may be seen in this second case that the pulse $\alpha$ is replaced by the pulse $\alpha'$ of different shape. The result of this deformation is that the amplitude of the pulse attains the threshold no longer at the instant T of the reception period, but at the instant T'. In the case illustrated by FIGURE 2B, the latter is not comprised in the same repetition period of the pulses $\delta$ and therefore the pulses $\eta$ and $\eta'$ do not have the same position in the reception period. These pulses correspond to the unequal distances D and D' between the pulse radar system and the object; the distances D and D' differ by one quantum. The result is that the presence of noise can modify the position of the pulses produced by the multivibrator 10 and therefore there is uncertainty regarding the distance D.

FIGURE 3 partially shows a receiver 14 according to the invention which does not have the defects of that in FIGURE 1. It will be noted that the parts of the receiver in FIGURE 3 which correspond to parts of the receiver in FIGURE 1 are indicated by similar reference numerals with the suffix "'."

In this receiver the video frequency voltage which appears at the output of the amplifier 2' is applied to two channels 15 and 16. The first of these comprises a threshold limiter device 3' which is identical to that used in the receiver 1. The second channel 16 comprises a differentiator device 17 and a limiter device 18. The two channels are respectively connected to the inputs of a multiplier device 19 which can be a logical AND circuit. The voltage produced by the latter is applied to the differentiator device 4' which is identical to that of the receiver of FIGURE 1 which has already been described. The other members of the receiver in FIGURE 3 are also analogous to the corresponding members of the receiver illustrated in FIGURE 1 and they will not be described.

The operation of the receiver in FIGURE 3 will be better understood by referring to the diagrams in FIGURE 4, which represent the voltages appearing at different points of this receiver.

The voltage produced by the video frequency amplifier 2' is represented by the curve of the line $a''$ in FIGURE 4. This voltage is applied to a limiter device at the output of which appear square pulses (line $b''$). The video frequency voltage is also applied to the differentiator 17 and the voltage produced by the latter (line *h*) feeds the threshold limiter device 18 which also produces square pulses (line *i*). The voltages appearing at the output of the devices 3 and 18 are multiplied by the device 19 which produces a non-periodic voltage of unequal square waves which is represented in line *f*. This voltage is applied to a differentiator device similar to the device 4 of the receiver in FIGURE 1. The latter produces two types of pulses, one types corresponding to sharp drops in the input voltage, and they are eliminated, and the others ($x_1, x_2 \ldots$, link *k*, FIGURE 4) correspond to the sharp increases in this input voltage, and these are transmitted to a quantizer 5' similar to the device 5 in FIGURE 1.

It should be noted that the pulses $\lambda$, $\mu$ and $\gamma$ which respectively appear at the outputs of the devices 10', 11' and 12' are shown on FIGURE 4 at lines *l*, *m* and *n*.

It will be noted that the presence of noise hardly at all affects the positions of the pulses $\gamma_1$, $\gamma_2$, $\gamma_3$ which afford the measurement of the distance between the pulse radar system and the object. In fact, when the video frequency voltage (line $a''$ FIGURE 4) comprises noise components, the slopes of the sides of the pulses $\alpha''$ vary but there is hardly any variation in the instant at which the amplitude of these pulses is maximum. Consequently the form of the voltage produced by the differentiator 17 varies little. The width of the pulses appearing at the output of the limiter device 3' may be modified in a considerable way but the instants at which the pulses produced by the limiter device 18 appear are practically fixed. It will be seen that, in these conditions, the positions of the pulses $\gamma_1$, $\gamma_2$, $\gamma_3$ are practically independent of the presence of noise.

I claim:

1. In a pulse radar receiver, adapted to receive echo pulses from targets, means responsive to said echo pulses comprising a video stage delivering video frequency pulses, means for determining the instant at which said video frequency pulses reach their maximum amplitude, comprising two channels, means in the first channel for clipping said video pulses with respect to a given threshold, means in the second channel to differentiate said video pulses and, means for clipping said differentiated pulses with respect to a given threshold, means connected to the output of both said channels to combine the pulses issuing from said first and second channels respectively whereby a signal is produced consisting in a series of alternately positive and negative pulses, the passage from a negative pulse to a positive one corresponding to the instant of passage of the considered video pulse through its maximum value whereby the targets are accurately detected.

2. In a pulse radar receiver adapted to receive echo pulses from targets, means responsive to said echo pulses comprising a video stage delivering video frequency pulses, means for determining the instant at which said video frequency pulses reach their maximum amplitude, comprising two channels, means in the first channel for clipping said video pulses with respect to be a given threshold and delivering a first series of rectangular pulses, means in the second channel to differentiate and clip said video pulses and delivering a second series of rectangular pulses, a "AND" circuit connected to both said first and second channels and receiving both said first and second series of rectangular pulses, said circuit delivering a series of alternately positive and negative rectangular pulses, means for differentiating said series of pulses and means for cancelling the resulting negative pulses, whereby the resulting positive pulses correspond to the instant at which the received video pulses reach their peak and means to work these positive pulses for determining the position of said video pulses and hence of the targets.

3. In a pulse radar receiver adapted to receive echo pulses from targets, means responsive to said echo pulses comprising a video stage delivering video frequency pulses, means for the determination of said echo pulses by detecting the peaks of said video pulses, comprising two channels with means in a first channel to generate a first series of rectangular pulses transformed from the received video pulses, means in a second channel to generate a second series of rectangular pulses transformed from the derivative of said video pulses, logical means receiving both said first and second series of rectangular pulses and generating a third series of alternately positive and negative rectangular pulses, means to differentiate said third series of pulses generating sharp positive and negative pulses corresponding to an increase and to a decrease respectively of the video pulses, means for quantizing said positive pulses only and means for determining the position of said positive pulses.

References Cited by the Examiner

UNITED STATES PATENTS 2,566,331 9/51 Huber et al. _____ 343—11 XR
2,566,332 9/51 Huber et al. _____ 343—11

DAVID G. REDINBAUGH, *Primary Examiner.*

CHESTER L. JUSTUS, *Examiner.*